United States Patent
Das et al.

(10) Patent No.: US 6,860,165 B2
(45) Date of Patent: Mar. 1, 2005

(54) SENSOR BULB ATTACHMENT

(75) Inventors: Sathish R. Das, Indianapolis, IN (US); Larry J. Burkhart, Indianapolis, IN (US)

(73) Assignee: Carrier Corporation, Farmington, CT (US)

( * ) Notice: Subject to any disclaimer, the term of this patent is extended or adjusted under 35 U.S.C. 154(b) by 53 days.

(21) Appl. No.: 10/356,892

(22) Filed: Feb. 3, 2003

(65) Prior Publication Data

US 2004/0151230 A1 Aug. 5, 2004

(51) Int. Cl.[7] .............................................. G01D 21/00
(52) U.S. Cl. ........................................................ 73/866.5
(58) Field of Search .................... 62/211, 227; 73/866.5

(56) References Cited

U.S. PATENT DOCUMENTS

| | | | |
|---|---|---|---|
| 4,714,176 A | * | 12/1987 | Wijnen ........................ 222/51 |
| 5,505,092 A | * | 4/1996 | Kowalski ..................... 73/730 |
| 6,578,373 B1 | * | 6/2003 | Barbier ........................ 62/158 |
| 2003/0000307 A1 | * | 1/2003 | Lohberg .................. 73/514.16 |

FOREIGN PATENT DOCUMENTS

| | | | | |
|---|---|---|---|---|
| FR | 2579322 A3 | * | 9/1986 | ............. G01F/1/22 |
| JP | 60190692 A | * | 9/1985 | ........... F04D/13/00 |
| JP | 2003075032 A | * | 3/2003 | ........... F25B/49/02 |

OTHER PUBLICATIONS

PTO 04–5295, English Language Translation of JP 60190692 A to Fugita, Shigehiko published Sep. 28, 1985.*

* cited by examiner

*Primary Examiner*—Charles D. Garber

(57) ABSTRACT

A tube is provided with an indentation long enough to receive a sensor bulb and having a nominal curvature corresponding to the outer curvature of the sensor bulb whereby, when secured by a clamp, which is suitably tightened, at least one of the members will deform to the curvature of the other member thereby achieving area contact between the members.

3 Claims, 1 Drawing Sheet

SENSOR BULB ATTACHMENT

BACKGROUND OF THE INVENTION

The sensing bulb of a sensor is often secured to a pipe or tube. For example, the sensing bulb of a thermostatic expansion valve, TXV, is typically secured to the line between the evaporator and compressor of an air conditioning or refrigeration system. The tube and the bulb are cylindrical in cross section such that there is only line contact for thermal conduction between the members if the members are in contact and if their axes are parallel. If the axes are not parallel there would only be a point contact. Poor sensor attachment can result in failure of the TXV and the system. Changing the shape of the tube or bulb will, at best, produce two line contacts absent an exact matching of curvature between the tube and bulb. This is impractical for mass production where sensors and their bulbs come in standard sizes and where modification of the tubing introduces a restriction and would not be made to the necessary tolerances in a mass production situation.

SUMMARY OF THE INVENTION

A tube to which a cylindrical sensor bulb is to be attached is provided with an indentation long enough to receive the sensor bulb and having a nominal curvature corresponding to the outer curvature of the sensor bulb. The indentation cradles the bulb thereby facilitating assembly while axially and circumferentially locating the sensor with respect to the tube. A strap type of clamp is placed around the tube and sensor bulb and tightened such that at least one of the members will deform to the curvature of the other member thereby achieving area contact between the members.

It is an object of this invention to provide area contact between a sensor bulb and a tube.

It is another object of this invention to maximize the sensing ability of a thermal sensor.

It is an additional object of this invention to axially and circumferentially locate a sensing bulb on a tube.

It is a further object of this invention to provide a more reliable air conditioning or refrigeration unit. These objects, and others as will become apparent hereinafter, are accomplished by the present invention.

Basically, a tube is provided with an indentation long enough to receive a sensor bulb and having a nominal curvature corresponding to the outer curvature of the sensor bulb whereby, when secured by a clamp, which is suitably tightened, at least one of the members will deform to the curvature of the other member thereby achieving area contact between the members.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
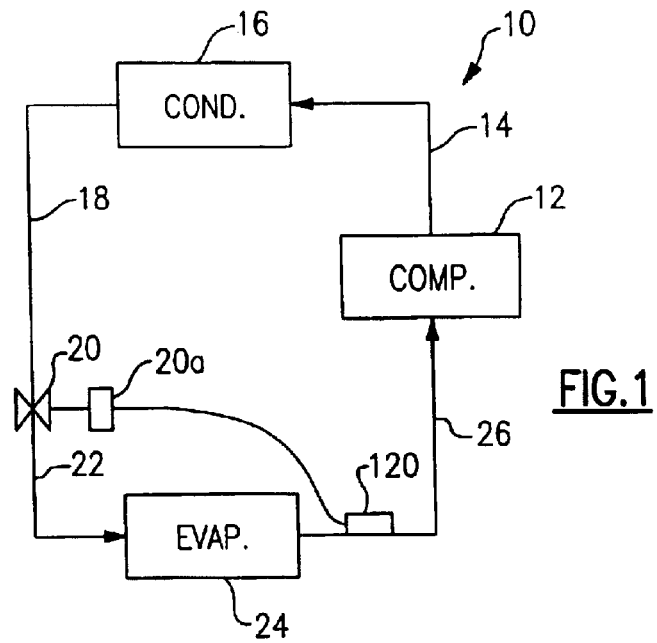
FIG. 1 is a schematic representation of a refrigeration or air conditioning system employing the present invention.

In FIG. 1, the numeral 10 generally designates a refrigeration or air conditioning circuit. Circuit 10 includes a compressor 12 which compresses suction gas to a higher temperature and pressure and delivers it via discharge line 14 to condenser 16 which is in a heat exchange relationship with the surrounding air. In the condenser 16, the hot refrigerant gas gives up heat to the condenser air thereby cooling the compressed gas and changing the state of the refrigerant from a gas to a liquid. Liquid refrigerant flows from condenser 16 via liquid line 18 to TXV 20. TXV 20 is operated through solenoid 20a responsive to temperature sensor 120 which is located between the outlet of evaporator 24 and the suction of compressor 12. Sensor 120 senses the superheat or quality of the refrigerant vapor leaving evaporator 24 and TXV 20 controls the amount of refrigerant entering evaporator 24 and the superheat of the refrigerant leaving evaporator 24. As the liquid refrigerant passes through the orifice of TXV 20, some of the liquid refrigerant vaporizes into a gas (flash gas). The mixture of liquid and gaseous refrigerant passes via distributor tubes 22 to the evaporator 24. Heat is absorbed by the refrigerant from the evaporator air by the balance of the liquid refrigerant causing it to vaporize in the coil of evaporator 24. The vaporized refrigerant then flows via suction line 26 to compressor 12 to complete the fluid circuit. The refrigerant circuit described so far is conventional. The present invention improves the securing of the sensor 120 to suction line 26 and hence the reliability of TXV 20.

Figure 2:
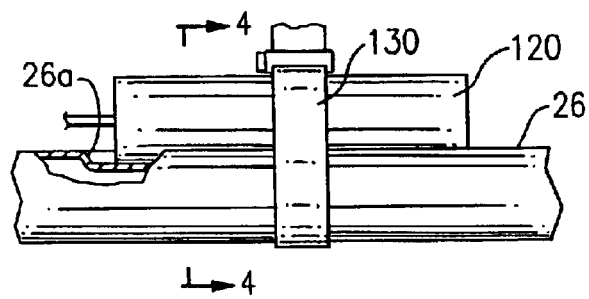
FIG. 2 is a partially cutaway side view of the sensor bulb secured in place.
Figures 3, 4:
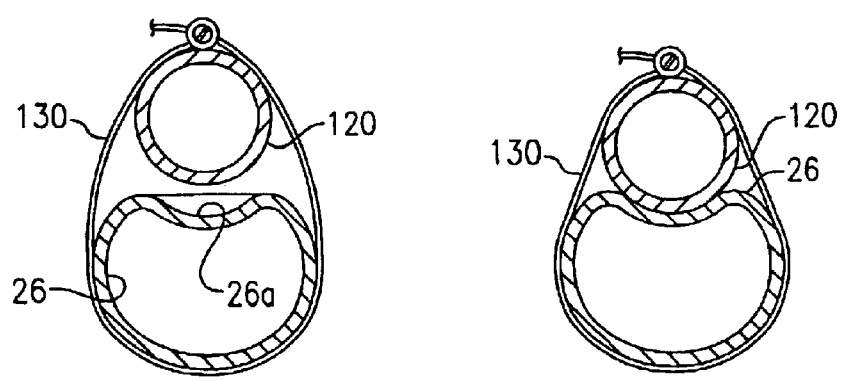
FIG. 3 is an exploded sectional view showing the relationship between the tube and the sensor bulb prior to assembly.
FIG. 4 is a sectional view taken along line 4—4 of FIG. 2.

Referring to FIGS. 2–4 it will be noted that sensor 120 is of a cylindrical shape. As best shown in FIGS. 2 and 3, suction line 26 has an indentation 26a formed therein which is of a length greater than the length of sensor 120 and having a curvature which is, nominally, the same as that of sensor 120. Indentation 26a is also curved at the ends to provide a smooth transition as to the restriction of line 26 that it produces. Because indentation 26a represents a restriction relative to suction line 26 a balance must be struck between the restriction imposed and the area of contact achieved. For a tube 26 having an outer diameter of 20.0 mm, a maximum indentation depth of 3.2 mm for indentation 26a would reduce the cross sectional flow area by 25% which has been found to be acceptable. With sensor 120 having a diameter of 19.0 mm and a length of 55.5 mm this amounts to 8.3 mm to 9.14 mm or 50–55° of circumferential sensor contact. This equates to an area contact of 421.6 to 464 mm$^2$. Any area contact is an improvement over point or line contact. Allowing for varying diameters of the tube 26 and sensor 120 as well as limitations on the acceptable pressure drop produced by the indentation 26a, contact over 30°–60° of the circumference of sensor 120 provides an acceptable balance with 45°–55° being preferred.

As noted above, the curvature of indentation 26a is nominally the same as that of sensor 120. Variation is caused by such factors as tool wear, variation in the force applied to form the indentation 26a, etc. As shown in FIGS. 2 and 3, the sensor is located with respect to indentation 26a so as to be received therein. With indentation 26a facing upward, sensor 120 is placed therein and held in place for assembly due to the cradling effect of indentation 26a. A strap, or the like, 130 is placed around the line 26 and sensor 120 and tightened as shown in FIG. 4. The tightening force is sufficient to deform the sensor 120 and/or the indentation 26a to achieve the desired area of contact. A BAND-IT® stainless steel tie made by BAND-IT-IDEX, INC. of Denver, Colo. provides the necessary securing force. The installing of a BAND-IT® tie using a pneumatic tool which applies an 80 psig force when tightening has proven acceptable. If necessary, or desired, more than one strap 130 may be used to hold sensor 120 in place in recess 26*a* of tube 26.

Although a preferred embodiment of the present invention has been illustrated and described, other changes will occur to those skilled in the art. For example, while the present invention has been described and illustrated in terms of a refrigeration or air conditioning circuit it may be used in other applications where sensors are secured to pipes or tubes. It is therefore intended that the scope of the present invention is to be limited only by the scope of the appended claims.

What is claimed is:

1. Attachment structure including:

a tube having an inner and an outer surface;

a sensor located externally of said tube and having a cylindrical shape and a curvature;

said tube having a depression in said outer surface for receiving said sensor and having a curvature which is, nominally, the same as said curvature of said sensor; and attachment means for surrounding said sensor and said tube and forcing at least one of said sensor and said tube to deform whereby area contact is achieved between said sensor and said tube;

wherein said tube is the suction line of an air conditioning circuit and said sensor is part of an expansion device.

2. The attachment structure of claim 1 wherein at least 15° of the circumference of said sensor is in contact with said tube.

3. A method of externally securing a cylindrically shaped sensor of an expansion device to a tube that is a line of an air condition circuit, the sensor having a first radius of curvature and the tube having a second radius of curvature including the steps of:

forming an indentation in said tube such that said indentation has said second radius of curvature which is nominally the same as said first radius of curvature;

locating said indentation facing upward;

placing said sensor in said upwardly facing indentation; and securing said sensor to said tube with enough force to produce area contact between said sensor and said tube.

* * * * *